United States Patent
Bantel et al.

(10) Patent No.: US 11,618,100 B2
(45) Date of Patent: Apr. 4, 2023

(54) RECHARGEABLE BATTERY PACK UNIT

(71) Applicant: Robert Bosch GmbH, Stuttgart (DE)

(72) Inventors: Christoph Bantel, Ditzingen (DE); Erkan Ebegoemeci, Leinfelden-Echterdingen (DE); Friedhelm Guenter, Burgstetten (DE); Mustafa Kemal Yesil, Sindelfingen (DE); Subramaniam Velalar Thaitchana Muruthi, Butterworth (MY); Andreas Engelmayer, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 412 days.

(21) Appl. No.: 16/622,413

(22) PCT Filed: Jun. 11, 2018

(86) PCT No.: PCT/EP2018/065297
§ 371 (c)(1),
(2) Date: Dec. 13, 2019

(87) PCT Pub. No.: WO2018/234074
PCT Pub. Date: Dec. 27, 2018

(65) Prior Publication Data
US 2020/0212409 A1 Jul. 2, 2020

(30) Foreign Application Priority Data

Jun. 19, 2017 (DE) .......................... 102017210210.1
Jul. 3, 2017 (DE) .......................... 102017211263.8

(51) Int. Cl.
B23K 26/00 (2014.01)
H01M 10/0525 (2010.01)
(Continued)

(52) U.S. Cl.
CPC ........ *B23K 26/082* (2015.10); *B23K 26/0626* (2013.01); *B23K 26/244* (2015.10);
(Continued)

(58) Field of Classification Search
CPC ........... B23K 26/08; B23K 26/20–206; B23K 26/21–22; B23K 26/24; B23K 26/26;
(Continued)

(56) References Cited

U.S. PATENT DOCUMENTS

| | | | | |
|---|---|---|---|---|
| 5,879,416 A | * | 3/1999 | Nakamura | ............. B23K 26/28 29/623.2 |
| 2002/0142211 A1 | * | 10/2002 | Nakanishi | ........... H01M 50/534 429/94 |

(Continued)

FOREIGN PATENT DOCUMENTS

| CN | 102074362 A | 5/2011 |
|---|---|---|
| CN | 104347839 A | 2/2015 |

(Continued)

OTHER PUBLICATIONS

International Search Report for PCT/EP2018/065297, dated Feb. 5, 2019.

*Primary Examiner* — Dana Ross
*Assistant Examiner* — Lawrence H Samuels
(74) *Attorney, Agent, or Firm* — Norton Rose Fulbright US LLP; Gerard Messina

(57) ABSTRACT

A rechargeable battery pack unit encompassing a rechargeable battery cell, which includes a cell pole, and encompassing a current collector, the cell pole being integrally joined to the current collector in a connecting area, a ratio of a wall thickness of the cell pole and the thickness of the current collector being maximally, and the current collector being made of copper.

24 Claims, 5 Drawing Sheets

(51) Int. Cl.
*B23K 26/082* (2014.01)
*B23K 26/244* (2014.01)
*B23K 26/06* (2014.01)
*H01M 50/213* (2021.01)
*H01M 50/562* (2021.01)
*H01M 50/559* (2021.01)
*H01M 50/522* (2021.01)
*H01M 50/503* (2021.01)
*H01M 50/516* (2021.01)
*B23K 103/12* (2006.01)
*B23K 101/36* (2006.01)
*B23K 101/38* (2006.01)

(52) U.S. Cl.
CPC ....... *H01M 50/213* (2021.01); *H01M 50/503* (2021.01); *H01M 50/516* (2021.01); *H01M 50/522* (2021.01); *H01M 50/559* (2021.01); *H01M 50/562* (2021.01); *B23K 2101/36* (2018.08); *B23K 2101/38* (2018.08); *B23K 2103/12* (2018.08); *H01M 2220/30* (2013.01)

(58) Field of Classification Search
CPC ................ B23K 26/28; H01M 50/169; H01M 50/516; H01M 50/536; H01M 50/566
See application file for complete search history.

(56) References Cited

U.S. PATENT DOCUMENTS

| | | | |
|---|---|---|---|
| 2005/0042508 A1* | 2/2005 | Kim | H01M 50/3425 429/185 |
| 2007/0099074 A1* | 5/2007 | Yoon | H01M 50/522 429/158 |
| 2011/0020674 A1* | 1/2011 | Fujita | H01M 50/3425 429/53 |
| 2011/0064993 A1* | 3/2011 | Ochi | H01M 50/54 429/158 |
| 2013/0171494 A1* | 7/2013 | Schaefer | B23K 26/0846 29/874 |
| 2014/0377625 A1 | 12/2014 | Tsutsumi et al. | |
| 2015/0047180 A1* | 2/2015 | Schmidt | B23K 1/0056 29/623.1 |
| 2015/0050532 A1 | 2/2015 | Waigel et al. | |
| 2015/0249234 A1* | 9/2015 | Feigl | H01M 50/184 429/94 |
| 2016/0193694 A1 | 7/2016 | Dinkelman | |
| 2016/0285067 A1 | 9/2016 | Zahn et al. | |
| 2017/0232553 A1* | 8/2017 | Sievi | B23K 26/0643 219/121.64 |
| 2018/0045232 A1* | 2/2018 | Capostagno | B23K 26/10 |
| 2018/0236605 A1* | 8/2018 | Finuf | B23K 26/244 |

FOREIGN PATENT DOCUMENTS

| | | |
|---|---|---|
| CN | 105814713 A | 7/2016 |
| DE | 102010045037 A1 | 3/2011 |
| DE | 102010013351 A1 | 12/2011 |
| DE | 102012206830 A1 | 10/2013 |
| DE | 102013208344 A1 | 11/2014 |
| DE | 102013211459 A1 | 12/2014 |
| DE | 102013220284 A1 | 4/2015 |
| JP | 2000058038 A | 2/2000 |
| JP | 2001093506 A | 4/2001 |
| JP | 2004071335 A | 3/2004 |
| JP | 2008123768 A | 5/2008 |
| JP | 2008210730 A | 9/2008 |
| JP | 2012130935 A | 7/2012 |
| JP | 2016533013 A | 10/2016 |
| JP | 2017098565 A | 6/2017 |
| JP | 2018505058 A | 2/2018 |
| NO | 2016128704 A2 | 8/2016 |
| WO | 2008018241 A1 | 2/2008 |
| WO | 2010016182 A1 | 2/2010 |
| WO | 2013000889 A1 | 1/2013 |
| WO | 2015113854 A2 | 8/2015 |
| WO | 2015178153 A1 | 11/2015 |
| WO | WO 2016128704 A2 * | 2/2016 |

* cited by examiner

RECHARGEABLE BATTERY PACK UNIT

BACKGROUND INFORMATION

Rechargeable battery packs, which are provided for operating portable devices, are usually designed to be preferably compact and weight-saving. For this reason, the wall thickness of cell poles of the rechargeable battery cells in such rechargeable battery packs is very small and generally in a range of a few tenths of a millimeter. So that the rechargeable battery cells may be connected to electrical contacts, the cell poles of the rechargeable battery cells are integrally joined to current collectors. A common ratio between the wall thickness of the cell poles and the thickness of the current collector in such rechargeable battery packs is in the range of approximately 1.

In order to reduce the heat development within the rechargeable battery pack, a current collector having a very low resistance is preferably selected. Conventional current collectors, for example, may be made of Ni or of copper alloys, and may be connected to the cell pole using a resistance welding process. Due to its low resistance, copper is a particularly suitable material for current collectors. Copper is not utilized in above-described rechargeable battery packs, however, since the resistance welding process is not suitable for connecting current collectors made of copper having a thickness of more than 0.1 mm to such thin cell poles.

SUMMARY

The present invention relates to a rechargeable battery pack unit encompassing at least one rechargeable battery cell, which includes a cell pole, and encompassing a current collector, the cell pole being integrally joined to the current collector in a connecting area, a ratio of a wall thickness of the cell pole and of a thickness of the current collector being up to 2.0, and the current collector being made of copper. Advantageously, during the operation of a rechargeable battery pack encompassing the rechargeable battery pack unit according to the present invention, a considerable reduction of the heat development is achieved, which increases the service life of the rechargeable battery pack unit. In addition, the maximum retrievable power is advantageously increased. Moreover, the present invention relates to a rechargeable battery pack, in particular to a rechargeable battery pack of a hand-held power tool, encompassing a rechargeable battery pack unit of the type described above.

The rechargeable battery pack preferably encompasses a housing, which is detachably connectable via a mechanical interface to an external consumer or a charging device. The external consumer may be designed, in particular, as a portable device. Preferably, the external consumer is designed as a gardening tool, such as a lawn mower or a hedge trimmer, as a hand-held power tool, such as an angle grinder, a screwdriver, a power drill, a hammer drill, etc., or as a measuring tool, such as a laser distance measuring device. The rechargeable battery pack is connectable to the consumer in a force-fit and/or form-locking manner via the mechanical interface. Advantageously, the mechanical interface encompasses at least one actuating element, via which the connection of the rechargeable battery pack to the consumer is detachable. Moreover, the rechargeable battery pack encompasses at least one rechargeable battery cell and an electrical interface, via which the at least one rechargeable battery cell is electrically connectable to the consumer. The rechargeable battery cell may be designed as a galvanic cell, which has a configuration, in which a cell pole comes to rest at one end and a further cell pole comes to rest at a diametrically opposed end. The cell pole is preferably made of a conductive metal, of a deep drawing steel, by way of example. In particular, the rechargeable battery cell includes a positive cell pole at one end and a negative cell pole at a diametrically opposed end. Preferably, the rechargeable battery cells are designed as NiCd or NiMh rechargeable battery cells, particularly preferably as lithium-based rechargeable battery cells. The rechargeable battery voltage of the rechargeable battery pack is generally a multiple of the voltage of a single rechargeable battery cell and results from the circuit (parallel or series) of the rechargeable battery cells. In common rechargeable battery cells having a voltage of 3.6 V, an exemplary rechargeable battery voltage of 3.6 V, 7.2 V, 10 V, 8 V, 14.4 V, 18 V, 36 V, 54 V, 108 V, etc., therefore results.

Preferably, the rechargeable battery cell is designed as an at least essentially cylindrical round cell, the cell poles being situated at ends of the cylindrical shape. The electrical interface encompasses, in particular, at least two electrical contact elements, which are designed for transmitting energy. Alternatively or additionally, the electrical interface may encompass a secondary charging coil element for inductive charging. Additionally, the electrical interface may include further contact elements, which are designed for transmitting additional information, preferably ascertained via the electronics system, to the consumer. This may be, for example, a state of charge of the rechargeable battery pack, a temperature within the rechargeable battery pack, a coding or a residual capacity of the rechargeable battery pack. It is possible that the electronics system regulates or controls the charging and/or discharging process of the rechargeable battery pack. The electronics system may encompass, for example, a circuit board, a processing unit, a transistor, a capacitor, and/or a memory. The electronics system may also encompass one or multiple sensor elements, for example, for ascertaining the temperature within the rechargeable battery pack. The electronics system may alternatively or additionally encompass a coding element, such as a coding resistor.

The current collector is designed, in particular, for establishing an electrical connection to the cell poles. Preferably, the current collector is electrically connected to one of the electrical contact elements. Alternatively or additionally, it is possible that the current collector is designed as a cell connector, which electrically connects at least two rechargeable battery cells to one another. The current collector has, in particular, a thickness of at least 0.1 mm, preferably a thickness of at least 0.2 mm, particularly preferably a thickness of at least 0.3 mm. The current collector is formed, in particular, from a copper sheet. The current collector is preferably made of a copper material having a copper portion of at least 98%. Preferably, the current collector is made of electrolyte copper having a copper portion of at least 99.5%. In particular, the material of which the current collector is made is not a copper-containing alloy. The current collector is designed, in particular, as one piece.

Moreover, it is provided that the ratio between the wall thickness of the cell pole and the thickness of the current collector is maximally 1.5, preferably maximally 1.0, particularly preferably maximally 0.8. Originating from a consistent wall thickness of the cell pole, the heat development and the performance of the rechargeable battery pack unit are further improved by reducing the ratio. The thickness of the current collector lies, in particular, in a range between 0.1 mm and 0.5 mm, preferably in a range between 0.2 mm and 0.4 mm, particularly preferably in a range of 0.3 mm.

Moreover, it is provided that the connecting area encompasses at least one welding seam, in particular a single welding seam, including a single start point and a single end point. Preferably, the connecting area is spanned, in particular, laterally from the at least one welding seam. Via the welding seam, an integral connection is established between the cell pole and the current collector. The welding seam is created, in particular, via a laser welding process. In particular, both cell poles of the rechargeable battery cell are each integrally joined to a current collector via a laser welding process. It is also possible, however, that only one cell pole of the rechargeable battery cell is connected to a current collector via the laser welding process and the other cell pole is connected to a current collector with the aid of another process. The other process may also be implemented via an integral connection or via a force-fit and/or form-locking connection. In particular, the start point differs from the end point of the welding seam.

It is also provided that the welding seam has an essentially uniform width across at least 90% of its length, in particular across its length. In this context, a width of the welding seam is to be understood, in particular, as the width of the welding seam on the surface of the current collector, on which a laser beam of a laser penetrates the current collector. Advantageously, a particularly good connection may be established as a result. An essentially uniform width is to be understood, in particular, as a variation of the width by at most 50%, preferably at most 25%, particularly preferably at most 15%, along the length of the welding seam. Alternatively to the width of the welding seam on the surface, it is also possible that the width of the welding seam is the area on the boundary surface between the current collector and the cell pole, which are integrally joined to one another via the laser welding process.

Moreover, it is provided that the welding seam and/or a further welding seam are/is not contacted and/or crossed. Advantageously it may be ensured, as a result, that the cell pole is not damaged. In particular, the welding seam and/or the further welding seam do/does not come into contact in the areas in which it or they extends/extend essentially in parallel to itself or to one another, or extends/extend having the same curvature with respect to itself or with respect to one another, in particular concentrically.

Moreover, it is provided that the welding seam is spaced apart from itself or from a further welding seam by less than four times its width, preferably twice its width, in particular its width, particularly preferably one half of its width. Advantageously it may be ensured, as a result, that the cell pole is not damaged.

In addition, it is provided that the connecting area takes up at least 40%, in particular at least 60%, preferably at least 80% of an end face of the cell pole. Advantageously, the connection between the cell pole and the current collector may be improved as a result. The spanned area is advantageously situated on the surface of the current collector, on which a laser beam of the laser penetrates the current collector.

Alternatively or additionally, it is provided that the connecting area is covered by at least 20%, in particular 35%, preferably 50%, by the at least one welding seam. Advantageously, the connection between the cell pole and the current collector may be further improved as a result.

Moreover, it is provided that the welding seam is essentially spiral-shaped, wavelike, meandering, or essentially straight.

The present invention also relates to a laser welding process for connecting a rechargeable battery cell to a current collector, which is made of copper. It is provided that a welding seam is formed by a straight and/or curved relative motion of a rechargeable battery pack unit encompassing the rechargeable battery cell and the current collector, and a laser beam with respect to one another. Advantageously, due to such a motion, an effective connection may be implemented between the rechargeable battery cell and the current collector.

The relative motion may take place, in particular, via a deflection of the laser beam with the aid of an optical system and/or via a movement of the rechargeable battery pack unit relative to the laser.

In addition, it is possible that the relative motion is additionally modulated, in particular periodically modulated. Due to the additional modulation of the straight and/or curved relative motion, the irradiated area is enlarged, with respect to its width, beyond the diameter of the laser beam, which results in a better heat distribution during the laser welding process and in a wider welding seam. The modulation preferably takes place via the optical system of a laser. Preferably, a rotatory motion in the form of a circular motion is modulated onto a linear relative motion, which results in a spiral motion about the linear relative motion.

Moreover, it is provided that the relative motion is modulated, in particular rotationally modulated, at a frequency in the range from 50 Hz through 2000 Hz, in particular in the range from 100 Hz through 400 Hz. The amplitude of the modulation is between 10% of the width of the welding seam up to 400% of the width of the welding seam. Advantageously, it may be ensured as a result that no local overheating of the current collector or of the rechargeable battery cell arises due to the laser excitation. Alternatively to the rotatory modulation, for example, a linear or a sinusoidal modulation is also possible, which may be designed in an amplitude-modulated or frequency-modulated manner.

Moreover, it is provided that a power of the laser is varied, in particular reduced, between a start point of the welding seam and an end point of the welding seam. Advantageously, it may be ensured as a result that the heating of the materials during the laser welding process has no interfering effect on the formation of the welding seam.

In particular, the power of the laser is reduced during the manufacture of the welding seam by at least 5%, preferably by at least 10%, particularly preferably by at least 20%. The reduction of the laser power may take place proportionally, over-proportionally, and/or stepwise.

Alternatively or additionally, it is provided that a welding speed is selected in such a way that a good welding seam is manufactured having a variation of up to 10%, in particular up to 20%, preferably up to 30%, of a maximum power of the laser. Advantageously, a particularly stable process may be implemented as a result. In addition, it is provided that the welding speed is in a range between 0.1 m/s and 3.0 m/s.

BRIEF DESCRIPTION OF THE DRAWINGS

Further advantages result from the following description of the figures. The figures and the description contain numerous features in combination. Those skilled in the art will advantageously also consider the features individually and combine them to form other meaningful combinations.

BRIEF DESCRIPTION OF THE DRAWINGS

Figure 1:
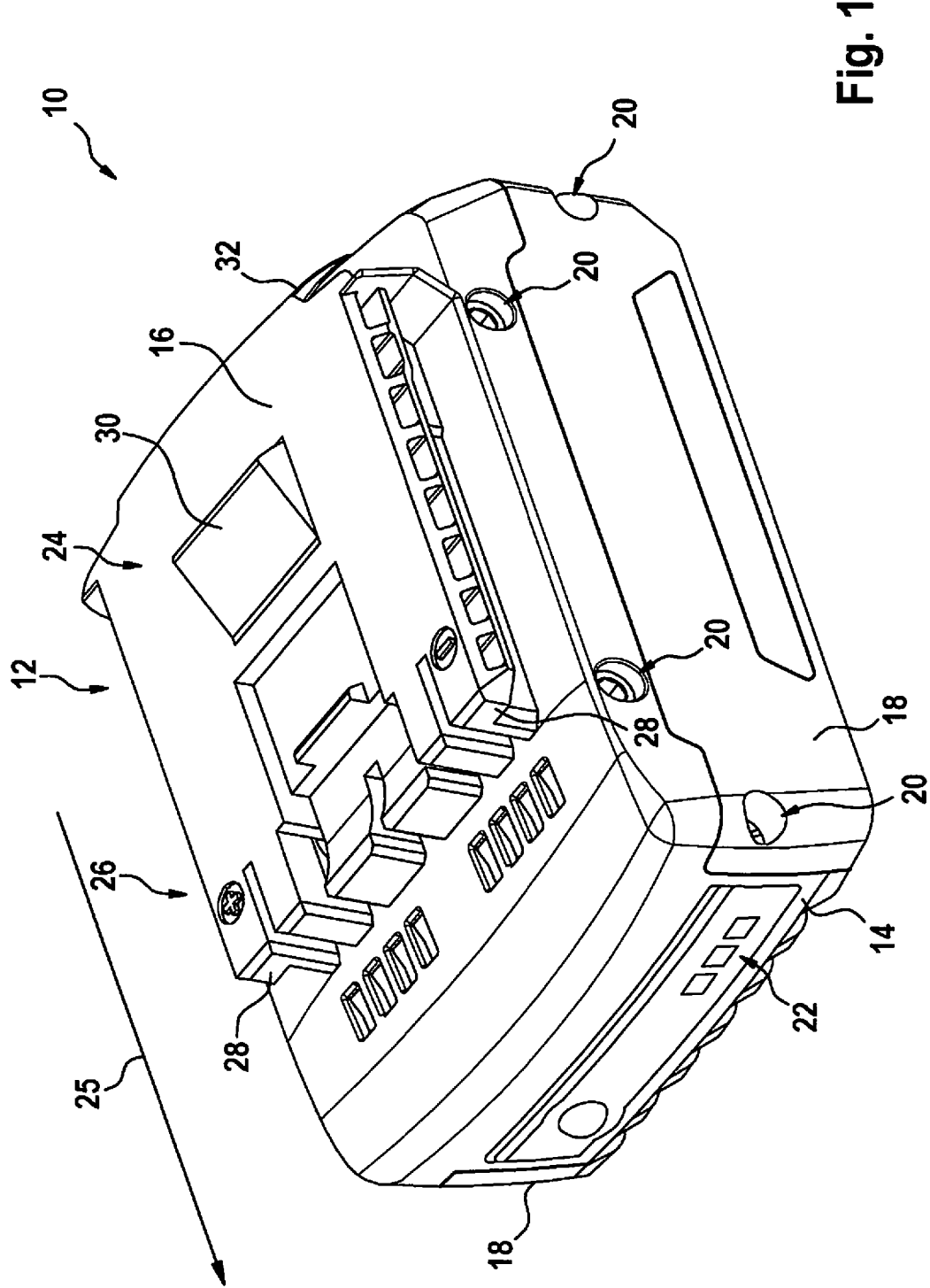

FIG. 1 shows a perspective view of a rechargeable battery pack.

Figure 2:
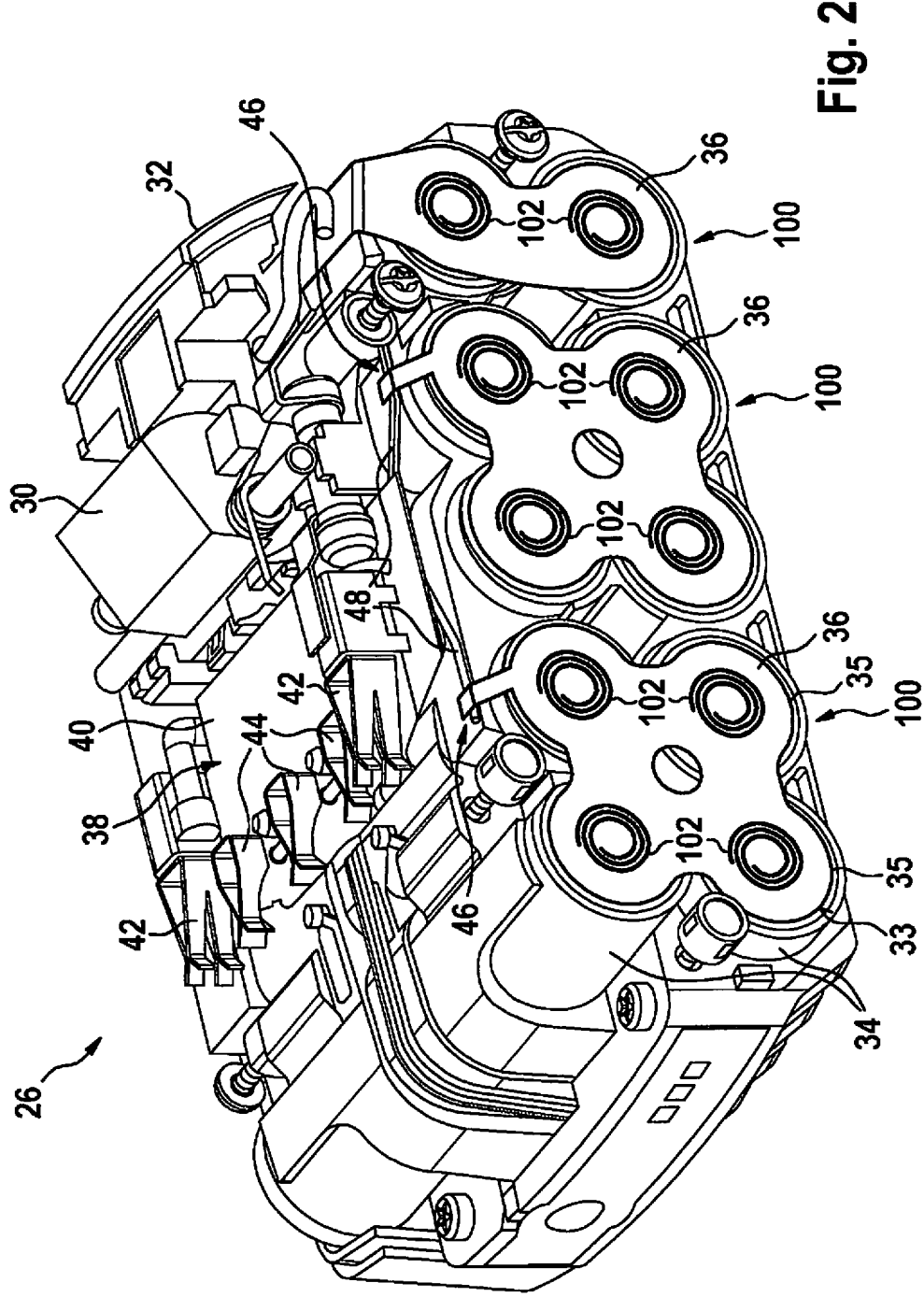

FIG. 2 shows a further perspective view of the rechargeable battery pack.

Figure 3A:
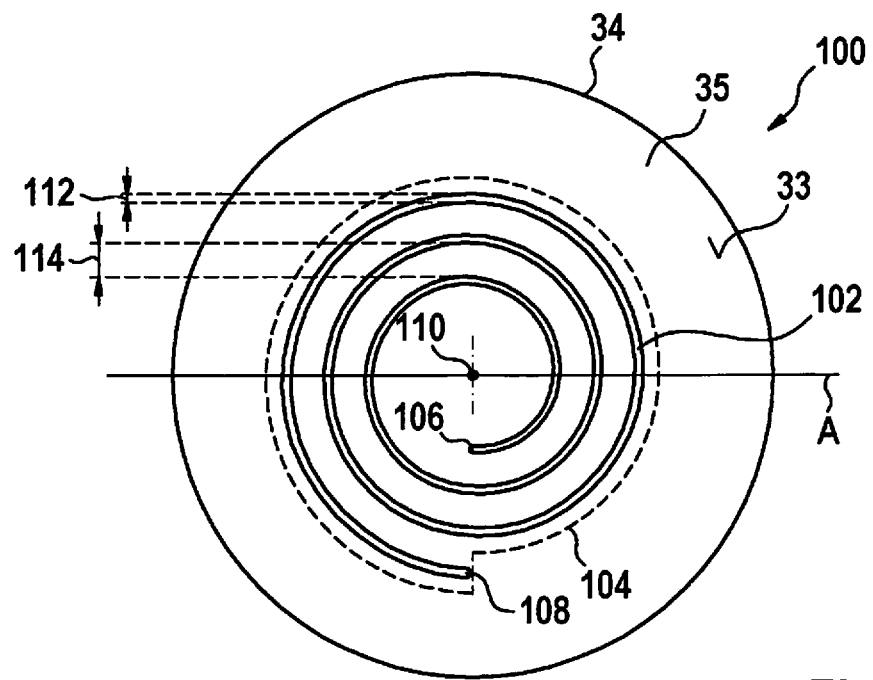

FIG. 3a shows a top view of a welding seam.

Figure 3B:
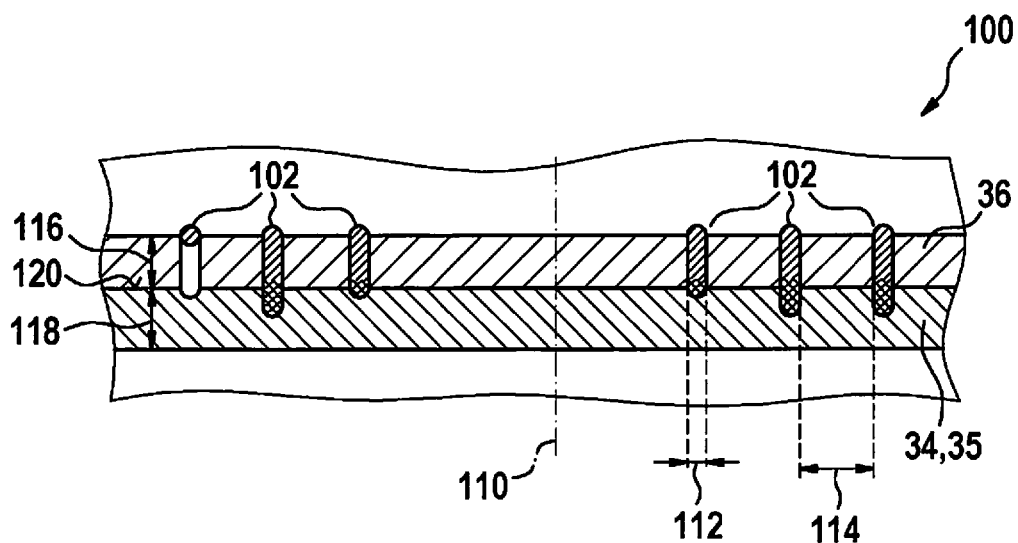

FIG. 3b shows a section through the welding seam according to FIG. 3a.

Figure 4:
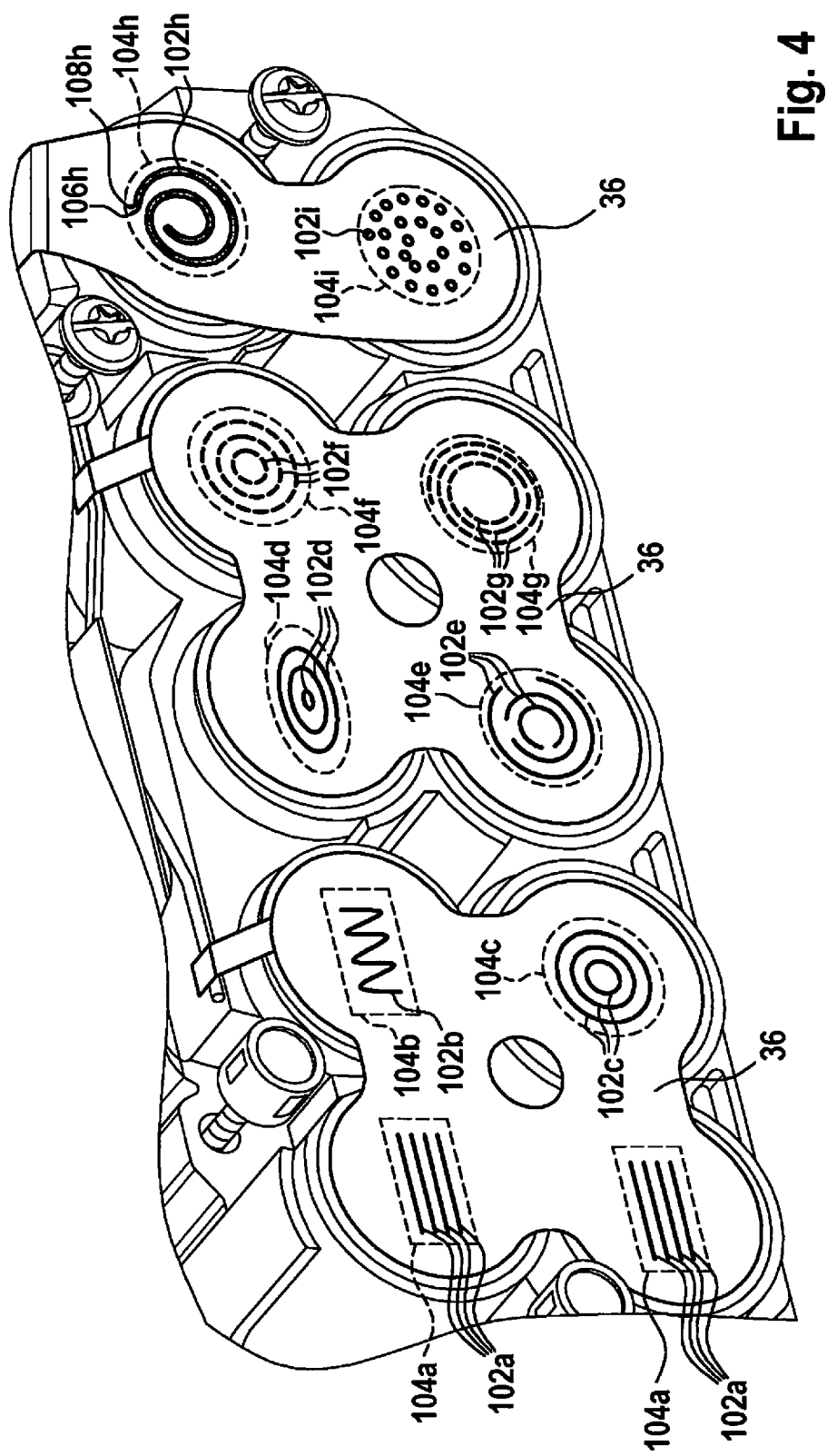

FIG. 4 shows a perspective view of an alternative exemplary embodiment of the rechargeable battery pack.

Figure 5:
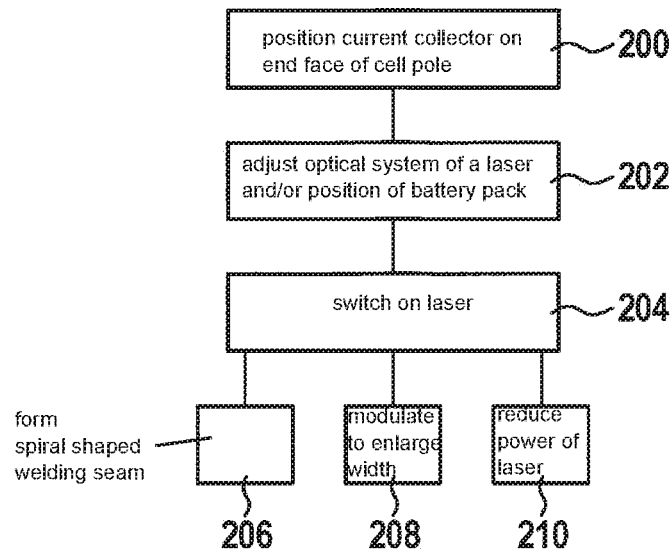

FIG. 5 shows a flow chart of a laser welding process according to the present invention.

Figure 6:
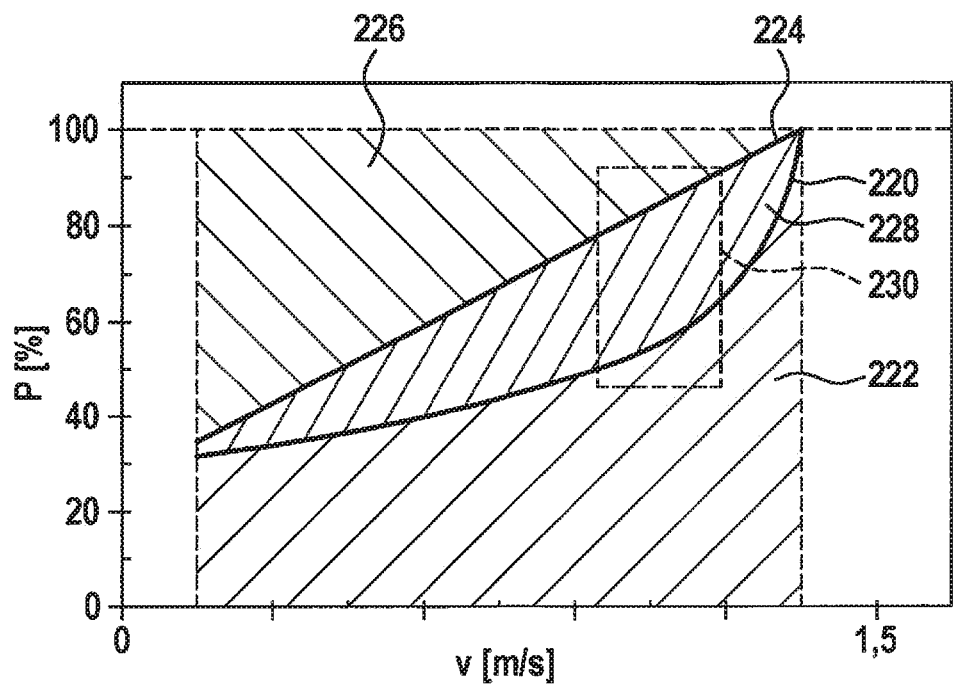

FIG. 6 shows a diagram including method parameters.

DETAILED DESCRIPTION OF EXAMPLE EMBODIMENTS

FIG. 1 shows a perspective view of a rechargeable battery pack 10. Rechargeable battery pack 10 is designed, by way of example, as a rechargeable battery pack of a hand-held power tool and is designed to be electrically and mechanically connectable to a hand-held power tool (not represented) in such a way that the hand-held power tool may be supplied with energy via rechargeable battery pack 10. The rechargeable battery pack encompasses a housing 12, which is made of multiple parts. Housing 12 encompasses a base body 14 on its underside, an interface housing part 16 on its top side, and two diametrically opposed lateral walls 18 on its lateral faces. Housing parts 14, 16, 18 are connected to one another via bolted connections 20. A charge level indicator 22 is situated on the front side of rechargeable battery pack 10, via which the state of charge of rechargeable battery pack 10 is displayable. Charge level indicator 22 is integrated in housing 12, in particular in base body 14. Housing 12, in particular interface housing part 16, encompasses a mechanical interface 24 and an electrical interface 26. Mechanical interface 24 and electrical interface 26 are designed for the detachable mounting and the electrical connection of rechargeable battery pack 10 on/to a hand-held power tool or on/to a charging device (not represented), each of which include a corresponding mechanical interface and an electrical interface.

Rechargeable battery pack 10 is designed, by way of example, as a sliding rechargeable battery pack. During the mounting of rechargeable battery pack 10, receiving means, for example, guide grooves and guide ribs, of the hand-held power tool or of the charging device are brought into engagement with rechargeable battery pack 10 in order to accommodate corresponding guide elements 28 of rechargeable battery pack 10, rechargeable battery pack 10 being inserted along the receiving means in an insertion direction 25, and mechanical interface 24 of rechargeable battery pack 10 being inserted into the corresponding mechanical interface of the hand-held power tool or the corresponding interface of the charging device. Mechanical interface 24 encompasses a locking element 30 for locking rechargeable battery pack 10 on the hand-held power tool or on the charging device. Locking element 30 is designed as a spring-loaded detent element, which is swivelably mounted in housing 12 of the rechargeable battery pack. The locking takes place by inserting rechargeable battery pack 10 along insertion direction 25, locking element 30 snapping into an undercut position at the end of the insertion motion. For releasing the lock, mechanical interface 24 encompasses an actuating element 32, which is movably coupled to locking element 30. Due to an actuation of actuating element 32, locking element 30 moves inward into housing 12 of rechargeable battery pack 10 and the lock between rechargeable battery pack 10 and the hand-held power tool or the charging device is released.

FIG. 2 shows rechargeable battery pack 10 without interface housing part 16 and without lateral walls 18. Base body 14 of housing 12 includes a cell holder area. At least one rechargeable battery cell 34 is accommodated in the cell holder area, rechargeable battery pack 10 in this specific embodiment encompassing, by way of example, ten rechargeable battery cells 34 connected in parallel or in series. Alternatively, it is also possible that rechargeable battery cells 34 are connected with the aid, for example, of cardboard tubes for insulating rechargeable battery cells 34 with respect to one another. Rechargeable battery cells 34 are designed in a cylindrical shape and encompass electrical cell poles 35 on their end faces 33.

The connection of rechargeable battery cells 34 to one another is implemented via current collectors 36 designed as cell connectors. Rechargeable battery cells 34 are integrally joined to current collectors 36 via a connecting area 104 in each case. Rechargeable battery cell 34 integrally joined to current collector 36 forms a rechargeable battery pack unit 100 according to the present invention. A single welding seam 102, which is manufactured via a laser welding process, is situated in each connecting area 104. Current collectors 36 are formed for electrically connecting rechargeable battery cells 34 to one another in a parallel and/or series circuit. In the represented specific embodiment, two or four rechargeable battery cells 34 are connected to each other via current collectors 36 in each case. Moreover, it is apparent that individual rechargeable battery cells 34 are accommodated spaced apart from each other in order to be mechanically fixed in the cell holder area of base body 14. The cell holder area is utilized not only for fixing rechargeable battery cells 34 in housing 12 but also for cooling rechargeable battery cells 34 and is made of a thermally conductive material, for example, aluminum or a highly thermally conductive plastic. Moreover, the cell holder area includes sleeve-like insulating walls, so that individual rechargeable battery cells 34 are separated and an electrical insulation of individual rechargeable battery cells 34 with respect to one another may be ensured. The heat transmission resistance between adjacent rechargeable battery cells 34 and between rechargeable battery cells 34 and the cell holder area is preferably low in this case, so that the heat losses generated by rechargeable battery cells 34 may be well dissipated to the outside and an overheating of rechargeable battery pack 10 in the interior may be prevented.

An electronics system 38 is situated above the cell holder area, in particular in the area between base body 14 and interface housing part 16. Electronics system 38 encompasses a circuit board 40. Electronics system 38 is connected to charge level indicator 22. Electrical contact elements 42, which are provided for charging and discharging rechargeable battery pack 10, and further contact elements 44, which are designed for transmitting state information, such as the state of charge or the temperature of rechargeable battery pack 10, to the hand-held power tool or to the charging device, are situated on circuit board 40. Electrical contact elements 42 and further contact elements 44 are assigned to electrical interface 26. Electrical contact elements 42 are connected to electronics system 38 and to rechargeable battery cells 34. The electrical connection of electrical contact elements 42 to rechargeable battery cells 34 takes place via contact points 46 designed as soldered joints at which rechargeable battery cells 34 are soldered via current collectors 36 to electrical connecting elements 48 designed as wires. Alternatively, a welding of current collector 36 to electrical connecting element 48 is also possible. Soldered joints 46 are situated between electronics system 38 and rechargeable battery cells 34.

FIG. 3a shows a top view of welding seam 102 from FIG. 2. Welding seam 102 extends in the shape of a spiral on the surface of current collector 36. Connecting area 104 is spanned by welding seam 102, in particular by the outer contour of welding seam 102. Welding seam 102 includes a single start point 106 at which the laser welding process is started, and a single end point 108 at which the laser welding process is ended. Start point 106 has a shorter distance to center 110 of connecting area 104 than end point 108. In particular, start point 106 is situated in the internal area of spiral-shaped welding seam 102 and end point 108 is situated in external area of spiral-shaped welding seam 102. Width 112 of welding seam 102 is essentially uniformly formed across its length. In particular, width 112 of the welding seam increases between start point 106 and end point 108 by less than 25%, by way of example, by approximately 20%. Spiral-shaped welding seam 102 encompasses, by way of example, three spiral coils, although more or fewer spiral-shaped coils are possible. The spiral coils extend essentially in the shape of parallel curves and are spaced apart from one another. Distance 114 between the spiral coils is approximately two times width 112 of welding seam 102. Width 112 of welding seam 102 essentially corresponds to 10% of the distance between the center of connecting area 104 and end point 108 of welding seam 102. Start point 106 is spaced apart from center 110 by essentially approximately 40% of the distance between center 110 of connecting area 104 and end point 108 of welding seam 102. Advantageously, as a result, welding seam 102 takes up in terms of area over 20% of connecting area 104. Moreover, connecting area 104 takes up in terms of area over 40% of end face 33 of cell pole 35.

FIG. 3b shows a cross section along plane A plotted in FIG. 3a. Thickness 116 of current collector 36 essentially corresponds to wall thickness 118 of cell pole 35. In particular, thickness 116 of current collector 36 and the wall thickness of cells pole 35 are both essentially 0.3 mm. Therefore, the ratio between wall thickness 118 of cell pole 35 and thickness 116 of current collector 36 is essentially 1.0. Current collector 36 is made of an electrolyte copper having a copper portion of 99.5%, and the cell pole is made of stainless steel or deep drawing steel. FIG. 3b also shows cross sections of six different points of welding seam 102. Current collector 36 and cell pole 35 are locally heated by the laser beam, so that a melt is formed, which forms welding seam 102. A good welding seam 102 is characterized in that the melted material of current collector 36 connects to the melted material of the cell pole in the area of a boundary surface 120 between current collector 36 and cell pole 35. The area of welding seam 102, in which current collector 36 and cell pole 35 become integrally joined to one another due to the laser welding process is indicated by way of a cross hatch. A breakthrough of cell pole 35, which generally results in a failure of rechargeable battery cell 34, is absolutely to be avoided. The cross section of welding seam 102 farthest from center 110 includes, by way of example, a high ejection of current collector material, which is also to be avoided.

FIG. 4 shows, by way of example, a rechargeable battery pack 10 encompassing a rechargeable battery pack unit 100 including alternative specific embodiments of welding seam 102.

Welding seam 102a is designed as a straight line, by way of example. In particular, four straight welding seams 102a, which extend in parallel to one another, are situated in connecting area 104a. Welding seams 102a are designed, in particular, to be spaced apart from one another. Start points 106a and end points 108a are formed, by way of example, at the same height, it also being possible that start points 106a and end points 108a do not lie at the same height. Welding seams 102a may have the same length, as shown, although a variation of the length is also possible.

Welding seam 102b has a wavelike design, by way of example. The amplitude and/or the frequency of the waveform may be designed to be constant or varying.

Welding seam 102c is formed, by way of example, as a closed round circle. In particular, three concentric, circular welding seams 102c, each having different radii, are situated in connecting area 104c.

Welding seam 102d is designed, by way of example, to be oval-shaped, in particular elliptical. In particular, three welding seams 102d, which are spaced apart from one another, are situated in connecting area 104d.

Welding seam 102e is formed as a non-closed, in particular c-shaped oval designed, by way of example, as a circle. Three welding seams 102e, the openings of which point in different directions, are situated in connecting area 104e.

Welding seam 102f is designed in the shape of a circular arc. In particular, at least three welding seams 102f form an interrupted circle. Two interrupted circles having different diameters are represented in connecting area 104f.

Welding seam 102g is designed in the shape of an oval. In particular, the welding seams situated in connecting area 104g form an interrupted spiral shape.

A single welding seam 102h is situated in connecting area 104h. Start point 106h as well as end point 108h of the welding seam are situated in the outer area of connecting area 104h. Welding seam 102h extends in the shape of a spiral in the direction of the center of connecting area 104h and in the shape of a spiral out of the center again.

Circular welding seams 102i are situated, in the shape of a spiral, in connecting area 104i.

In FIGS. 2 and 4, it is apparent that welding seams 102a through i do not contact and/or cross one another.

FIG. 5 shows the laser welding process for connecting a rechargeable battery cell 34 to a current collector 36, which is made of copper, with the aid of a flow chart. In a first step 200, current collector 36 is positioned on end face 33 of cell pole 35 of rechargeable battery cell 34. In a further step 202, an optical system of a laser and/or the position of rechargeable battery pack unit 100 are/is adjusted in such a way that a focus of the laser lies in the area of start point 106 of welding seam 102 to be manufactured.

In a further step 204, the laser is switched on and the surface of current collector 36 is irradiated with the aid of the laser. The irradiation may take place perpendicularly to the surface of current collector 36. Preferably, the surface is irradiated at an angle in a certain area, for example, 20% deviation from a perpendicular arrangement. In particular, the laser is designed as an infrared laser having a power of several hundred watts or a few kilowatts. For the purpose of precise structuring, the spot size of the laser, which corresponds to a diameter of the laser beam on the surface of current collector 36, is, in particular, less than 100 μm.

The laser beam and rechargeable battery pack unit 100 are moved with respect to one another in a step 206 in such a way that a spiral-shaped welding seam 102 (see FIG. 3a) arises. The relative motion with respect to one another takes place, in particular, at an essentially constant welding speed in a range between 0.1 m/s and 0.3 m/s. The relative motion takes place from start point 106 of welding seam 102 up to end point 108 of the welding seam. The relative motion takes place, in particular, via a curved motion. During the manufacture of the welding seam, welding seam 102 lengthens depending on the welding speed.

In a parallel step 208, which is alternative to or in addition to step 206, the relative motion is additionally modulated in such a way that the width of welding seam 102 is enlarged. Advantageously, as a result, a particularly uniform heating of current collector 36 or of cell pole 35 may be ensured. In particular, the modulation of the relative motion has no effect on the welding speed. The modulation is preferably designed as a circular motion having a frequency of several hundred Hz. In particular, the radius of the circular modulation is smaller than three times the diameter, preferably less than twice the diameter, particularly preferably smaller than the diameter, of the spot size of the laser.

In a further step 210, which is parallel to steps 206, 208, the power of the laser is constantly reduced during the relative motion. As the duration of the irradiation of rechargeable battery pack unit 100 increases, the materials heat up in such a way that the output at which a welding defect is likely to occur in the welding seam, considerably decreases as compared to the non-heated state. Advantageously, due to the reduction of the laser power, an essentially uniform width of the welding seam without welding defects is ensured.

In FIG. 6, the method parameters "laser power" and "welding speed" are plotted with respect to one another in a diagram. Curve 220 represents the minimal method parameters at which a good welding seam 102 may be manufactured, which integrally joins current collector 36 to cell pole 35. The method parameters are situated in area 222 under curve 220, in the case of which, due to the inadequate laser power or due to the excessive welding speed, welding seam 102 is not sufficiently heated at boundary surface 120 between current collector 36 and rechargeable battery cell 34 in order to create an integral connection in the area of boundary surface 120. Curve 224 represents the maximum method parameters, up to which a good welding seam 102 is manufacturable. In area 226 above curve 224, the heating of rechargeable battery pack unit 100 is so high that there is a high probability that current collector material is removed and cracks and/or pores form. Moreover, it may also happen that cracks and/or pores arise in cell pole 35 or the laser excitation penetrates rechargeable battery cell 34 and, therefore, rechargeable battery cell 34 is damaged.

The combinations of method parameters, with the aid of which a good welding seam 102 may be manufactured, are situated in area 228 between the two curves 220, 224. In order to manufacture a good welding seam 102, a welding speed is preferably selected, at which the distance between the minimum laser power and the maximum laser power is at a maximum, such as in area 230, by way of example. At a welding speed in area 230, the laser power may vary by over 20% of the maximum laser power without welding seam 102 having defects or an integral connection not forming. In particular, a good welding seam, in which essentially no critical defects occur, arises in area 230. In this context, a critical defect is to be understood, in particular, to be a defect, in which the functional capability of the rechargeable battery pack unit is reduced or is permanently not ensured. Due to the selection of a welding speed in this area 230, a particularly constant laser welding process may be advantageously implemented, in which a good welding seam 102 is manufactured even given fluctuations in the laser power.

What is claimed is:

1. A laser welding method for connecting a rechargeable battery cell to a current collector which is made of copper, the method comprising the following steps:
    forming a welding seam by a straight and/or curved relative motion of a rechargeable battery pack unit encompassing the rechargeable battery cell and the current collector, and a laser beam with respect to one another,
    wherein a power of a laser is reduced between a start point of the welding seam and an end point of the welding seam,
    wherein a welding speed is selected in such a way that the welding seam is manufactured at a variation of up to 10% of a maximum power of a laser that generates the laser beam.

2. The laser welding method as recited in claim 1, wherein the relative motion is rotationally modulated at a frequency in a range from 50 Hz through 2000 Hz.

3. The laser welding method as recited in claim 1, wherein the relative motion is rotationally modulated at a frequency in a range from 100 Hz through 400 Hz.

4. The laser welding process as recited in claim 1, wherein the welding speed is in a range between 0.1 m/s and 3.0 m/s.

5. The laser welding method as recited in claim 1, wherein the welding seam forms a connecting area that integrally joins a cell pole to the current collector.

6. The laser welding method as recited in claim 5, wherein a ratio of a wall thickness of the cell pole and a thickness of the current collector is maximally 2.0.

7. The laser welding method as recited in claim 5, wherein a ratio of a wall thickness of the cell pole and a thickness of the current collector is maximally 1.5.

8. The laser welding method as recited in claim 5, wherein a ratio of a wall thickness of the cell pole and a thickness of the current collector is maximally 1.0.

9. The laser welding method as recited in claim 5, wherein a ratio of a wall thickness of the cell pole and a thickness of the current collector is maximally 0.8.

10. The laser welding method as recited in claim 5, wherein the welding seam is a single welding seam that includes a single start point and a single end point.

11. The laser welding method as recited in claim 5, wherein the welding seam has a uniform width across at least 90% of its length.

12. The laser welding method as recited in claim 5, wherein the welding seam has a uniform width across its entire length.

13. The laser welding method as recited in claim 5, wherein the welding seam and a further welding seam do not contact and/or cross.

14. The laser welding method as recited in claim 5, wherein a first portion of the welding seam is spaced apart from a second portion of the welding same that runs alongside the first portion by less than four times its width.

15. The laser welding method as recited in claim 5, wherein a first portion of the welding seam is spaced apart from a second portion of the welding same that runs alongside the first portion by less than twice its width.

16. The laser welding method as recited in claim 5, wherein a first portion of the welding seam is spaced apart from a second portion of the welding same that runs alongside the first portion by one half of its width.

17. The laser welding method as recited in claim 5, wherein the connecting area takes up at least 40% of an end face of the cell pole.

18. The laser welding method as recited in claim 17, wherein the connecting area is covered by at least 20% by the at least one welding seam.

19. The laser welding method as recited in claim 5, wherein the connecting area takes up at least 60% of an end face of the cell pole.

20. The laser welding method as recited in claim 5, wherein the connecting area takes up at least 80% of an end face of the cell pole.

21. The laser welding method as recited in claim 5, wherein the welding seam is spiral-shaped.

22. The laser welding method as recited in claim 5, wherein the welding seam is straight.

23. The laser welding method as recited in claim 1, further comprising arranging the battery pack unit in a hand-held power tool.

24. A laser welding method for connecting a rechargeable battery cell to a current collector which is made of copper, the method comprising the following steps:
  forming a welding seam by a straight and/or curved relative motion of a rechargeable battery pack unit encompassing the rechargeable battery cell and the current collector, and a laser beam with respect to one another,
  wherein a power of a laser is reduced between a start point of the welding seam and an end point of the welding seam,
  wherein the welding seam and a further welding seam do not contact,
  wherein the welding seam is a single welding seam that includes a single start point and a single end point,
  wherein the welding seam has a uniform width across at least 90% of its length.

* * * * *